US008267139B2

(12) United States Patent
Schellhase et al.

(10) Patent No.: US 8,267,139 B2
(45) Date of Patent: Sep. 18, 2012

(54) METHOD FOR MANUFACTURING A LAMINATED MOULD PART

(75) Inventors: Juergen Schellhase, Eschwege-Niederhohne (DE); Jochen Gassan, Landau (DE); Carsten Nickel, Kaufungen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 85 days.

(21) Appl. No.: 12/300,009

(22) PCT Filed: May 8, 2007

(86) PCT No.: PCT/EP2007/004276
§ 371 (c)(1),
(2), (4) Date: Jun. 29, 2009

(87) PCT Pub. No.: WO2007/128589
PCT Pub. Date: Nov. 15, 2007

(65) Prior Publication Data
US 2009/0294041 A1 Dec. 3, 2009

(30) Foreign Application Priority Data

Jun. 11, 2007 (DE) .................. 10 2006 022 040

(51) Int. Cl.
*B30B 15/06* (2006.01)
*B30B 15/34* (2006.01)
(52) U.S. Cl. .................. 156/443; 156/583.91; 425/519

(58) Field of Classification Search .................. None
See application file for complete search history.

(56) References Cited

U.S. PATENT DOCUMENTS

| 2,796,634 | A | * | 6/1957 | Chellis | 264/257 |
|---|---|---|---|---|---|
| 5,076,880 | A | * | 12/1991 | Spengler et al. | 156/382 |
| 5,413,661 | A | * | 5/1995 | Spengler et al. | 156/515 |
| 5,741,386 | A | * | 4/1998 | Tomioka et al. | 156/212 |
| 6,524,510 | B2 | * | 2/2003 | Spengler | 264/248 |
| 6,673,296 | B2 | * | 1/2004 | Hiraiwa et al. | 264/275 |
| 2009/0065966 | A1 | * | 3/2009 | Schilles | 264/163 |

FOREIGN PATENT DOCUMENTS

| DE | 4008221 | 9/1990 |
|---|---|---|
| EP | 0348357 | 12/1989 |
| EP | 0384270 | 8/1990 |
| EP | 0686476 | 12/1995 |
| WO | WO 2006029590 A1 * | 3/2006 |

* cited by examiner

*Primary Examiner* — John L. Goff
*Assistant Examiner* — Barbara J. Musser
(74) *Attorney, Agent, or Firm* — Fay Kaplun & Marcin, LLP

(57) ABSTRACT

A method for manufacturing a laminated mould part, preferably of a mould part for the inner trim of a vehicle, consisting of a shape-stable carrier part and a visible-side lamination connected to this, of film, fabrics or similar decorative lamination materials, with which a heated blank of a mat-like or plate-like semifinished product of fibre materials containing binding agent, is moulded into a mould part in a moulding tool, and thereby simultaneously is connected to the lamination (one-shot method). The lamination is regionally connected with the help of "rams" before the moulding procedure or lamination procedure with the semifinished product, in order to achieve an exact positioning of a seam or likewise.

13 Claims, 12 Drawing Sheets

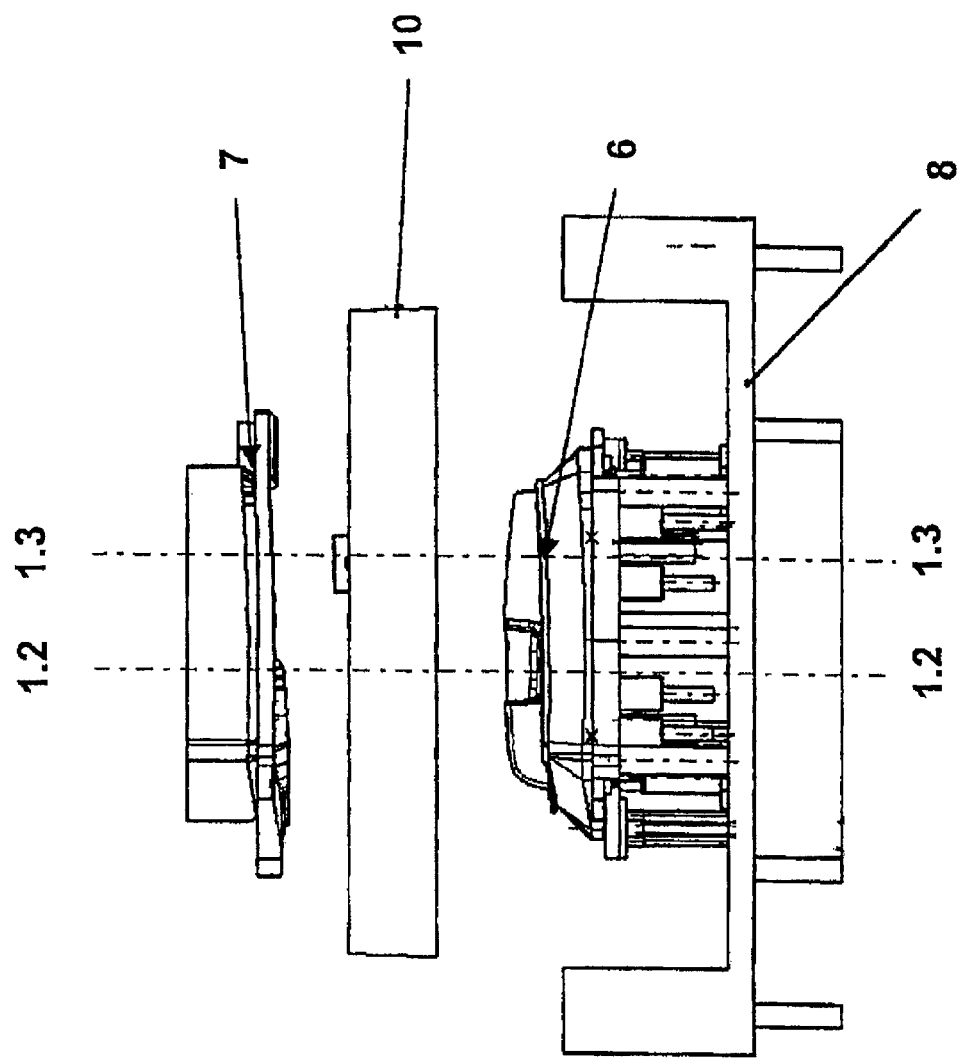
Fig. 1.1

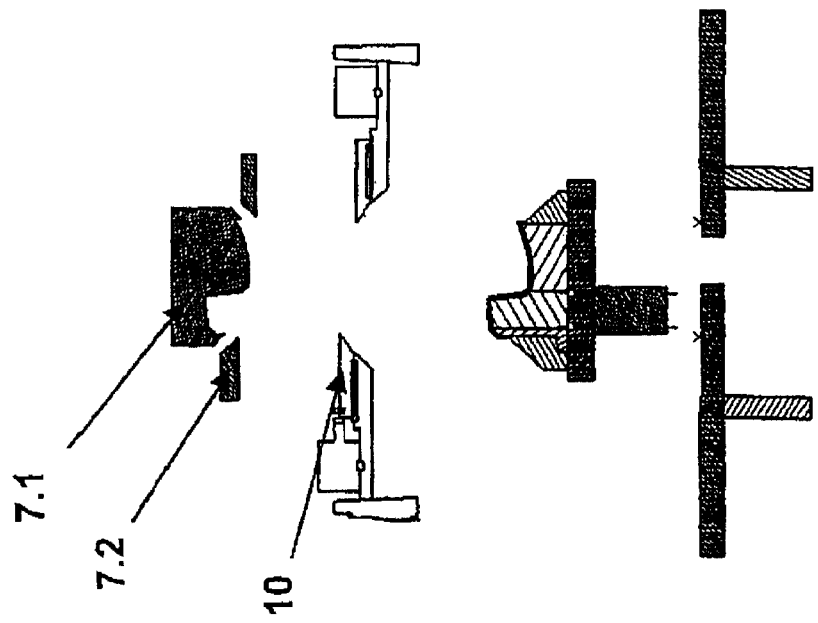
Fig. 1.3
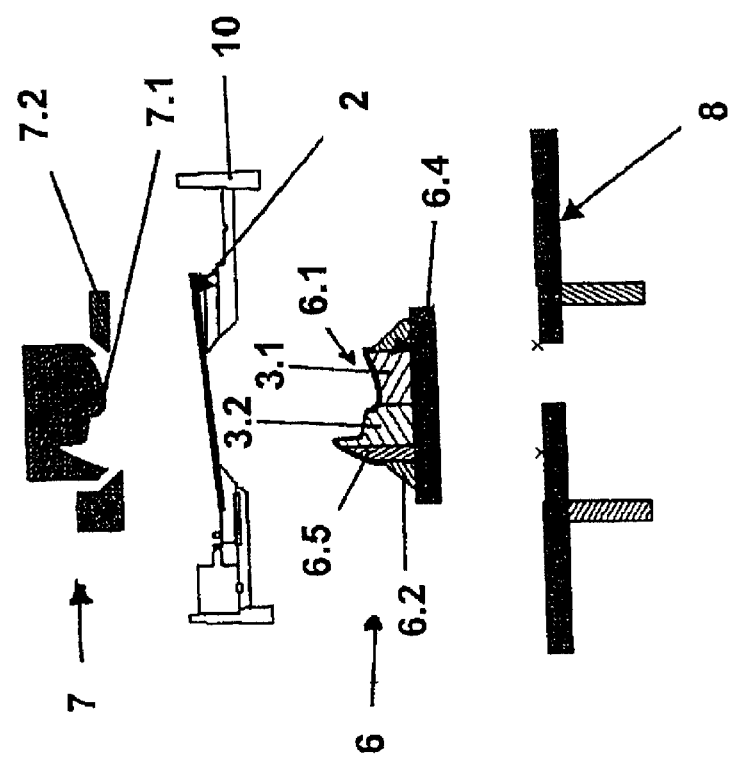
Fig. 1.2

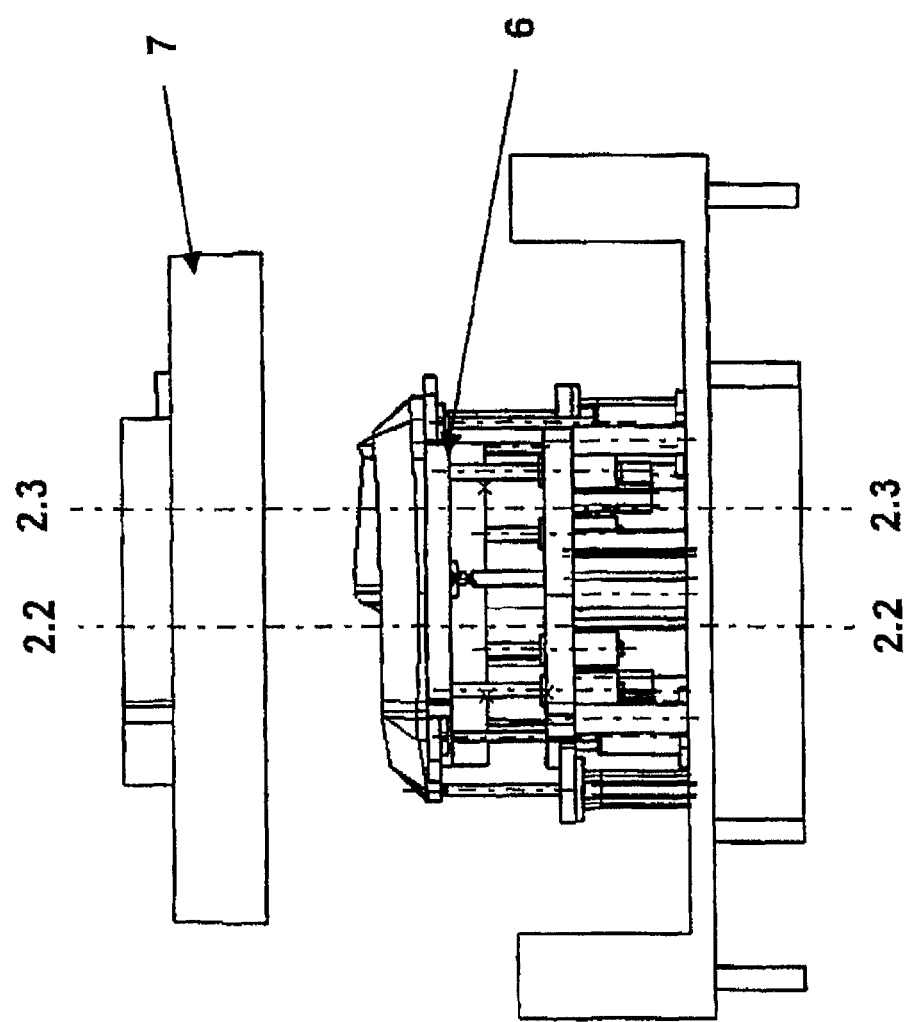
Fig. 2.1

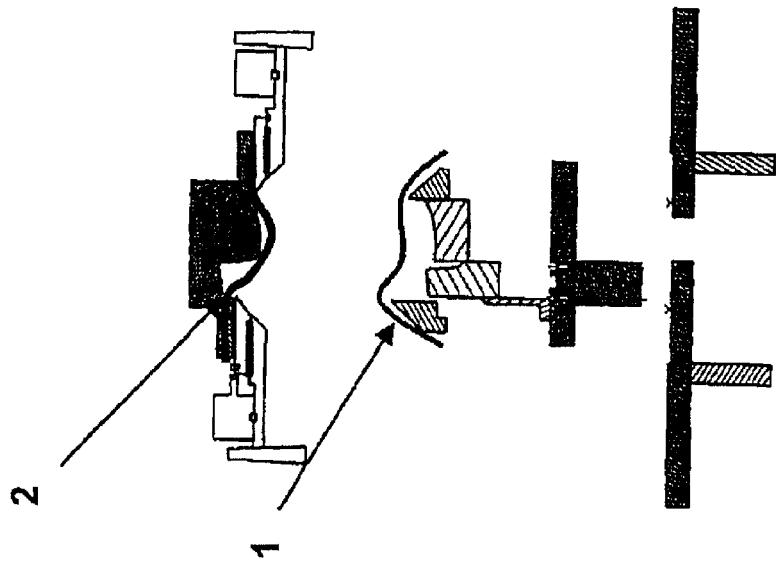
Fig. 2.3
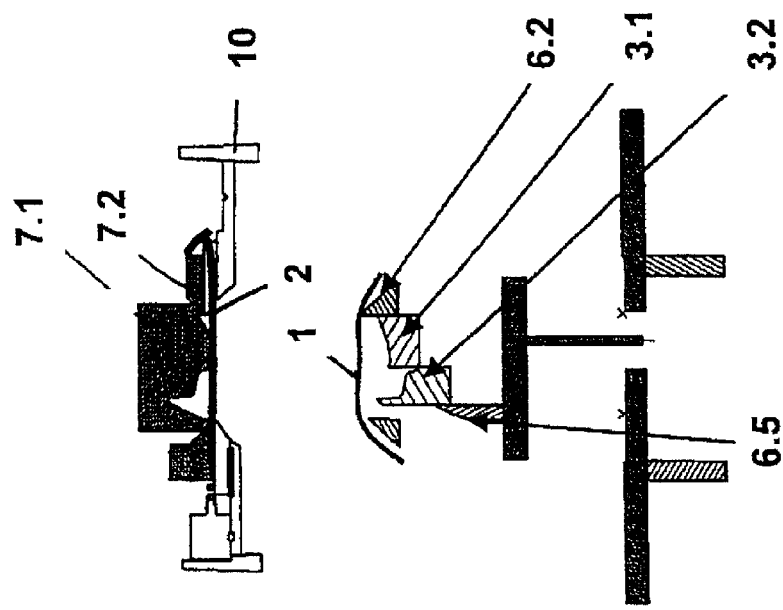
Fig. 2.2

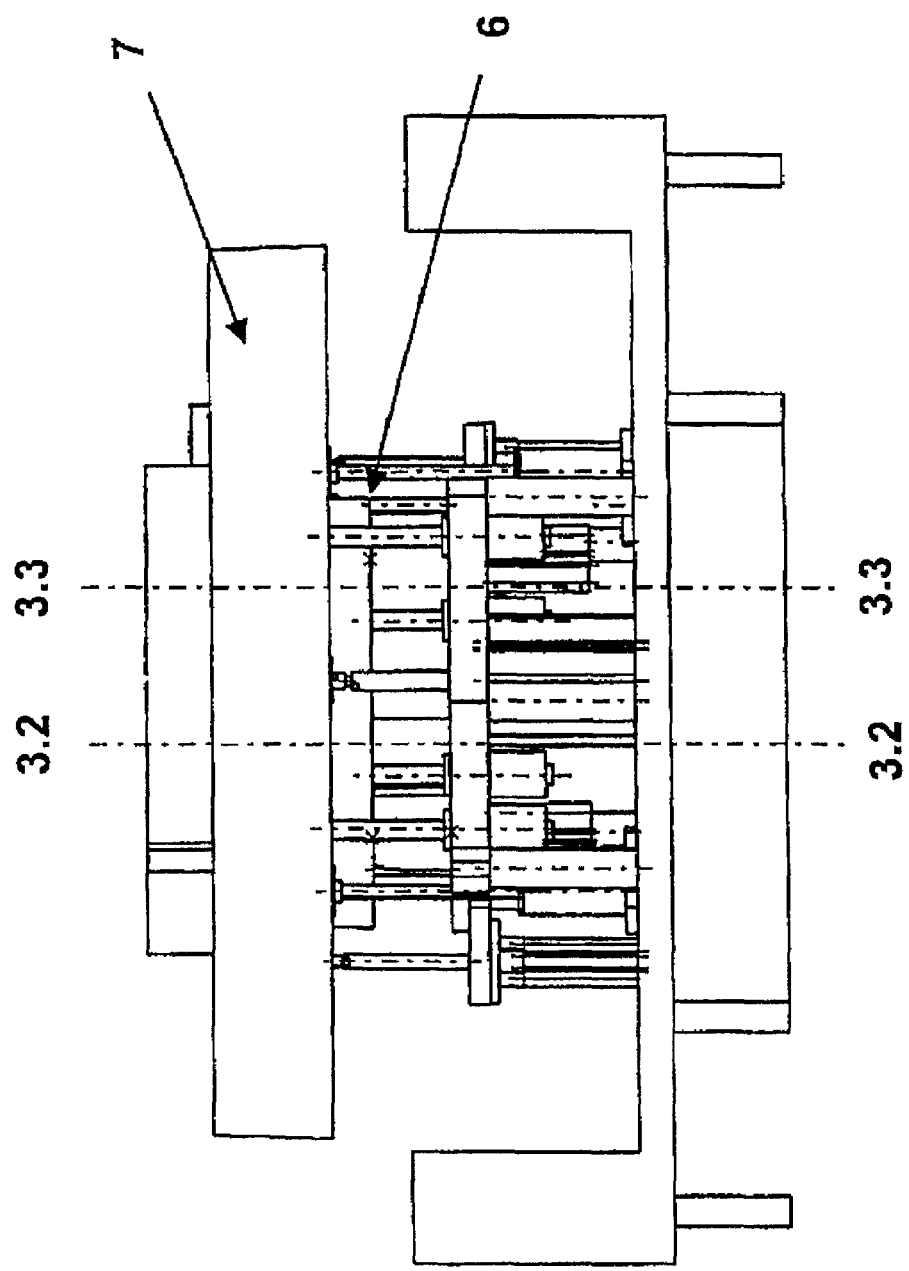
Fig. 3.1

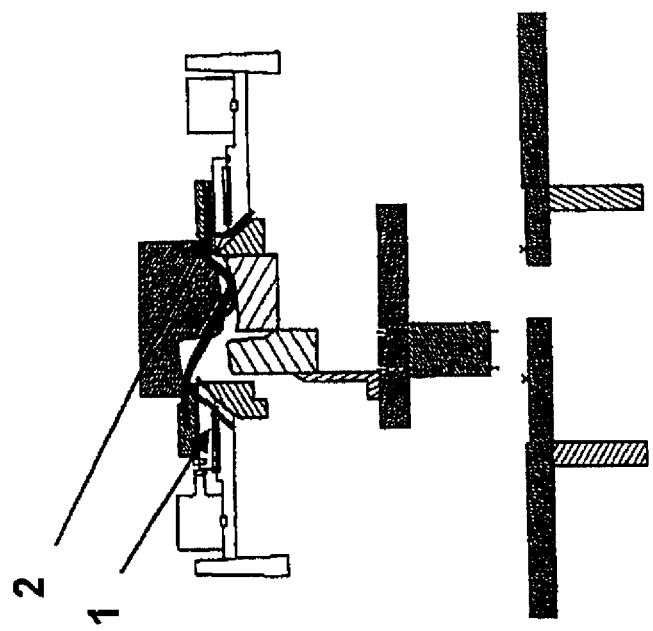
Fig. 3.3
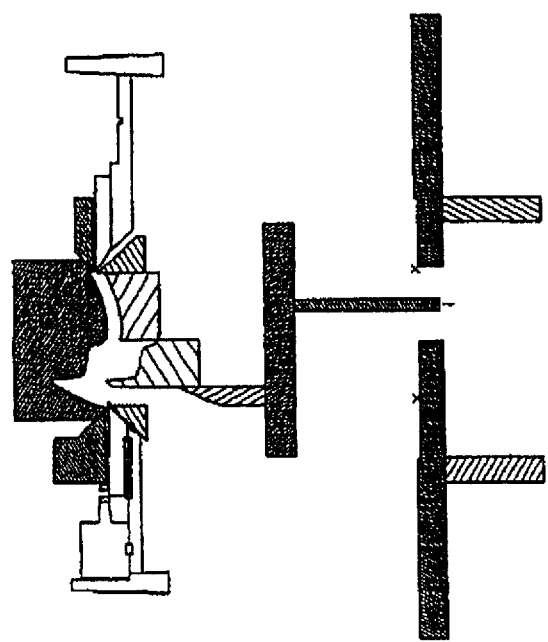
Fig. 3.2

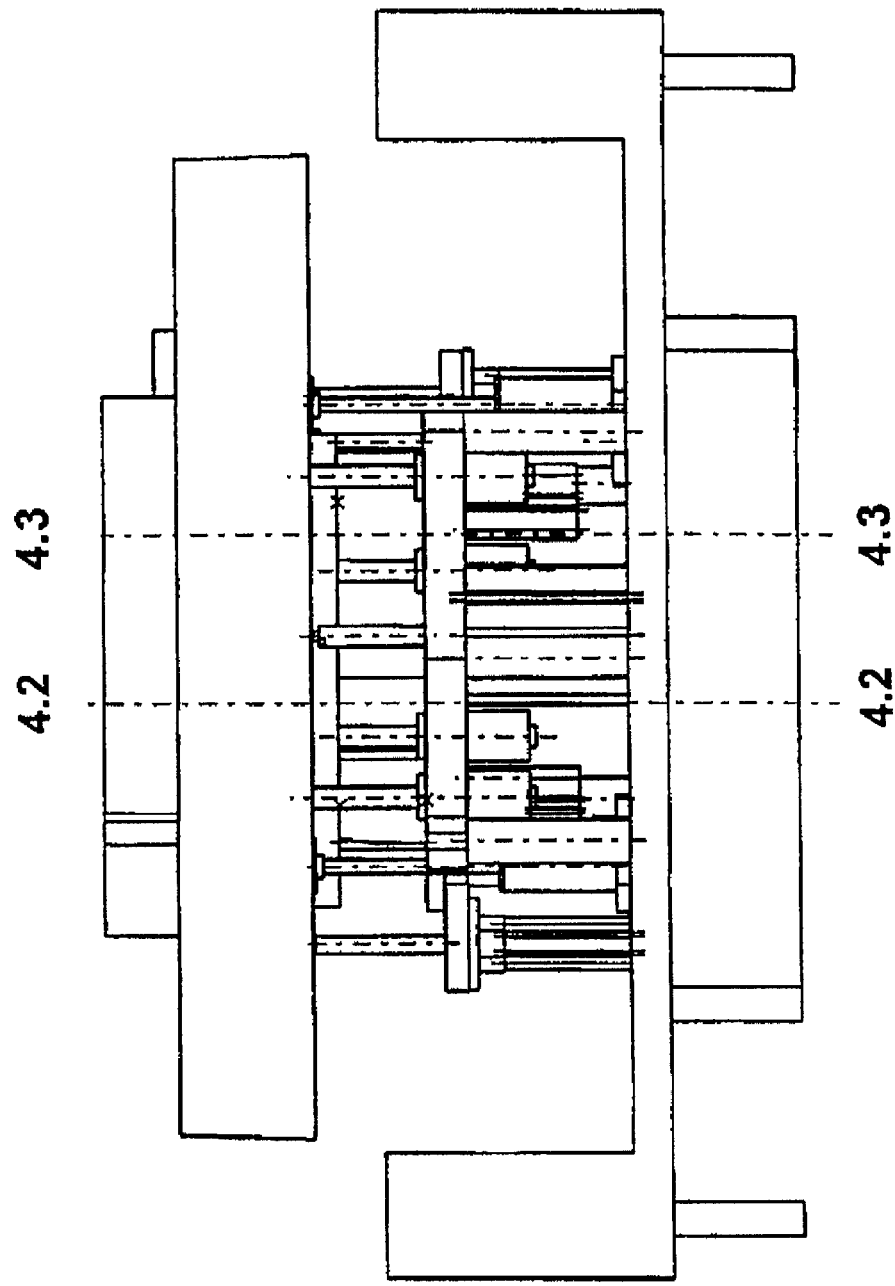
Fig. 4.1

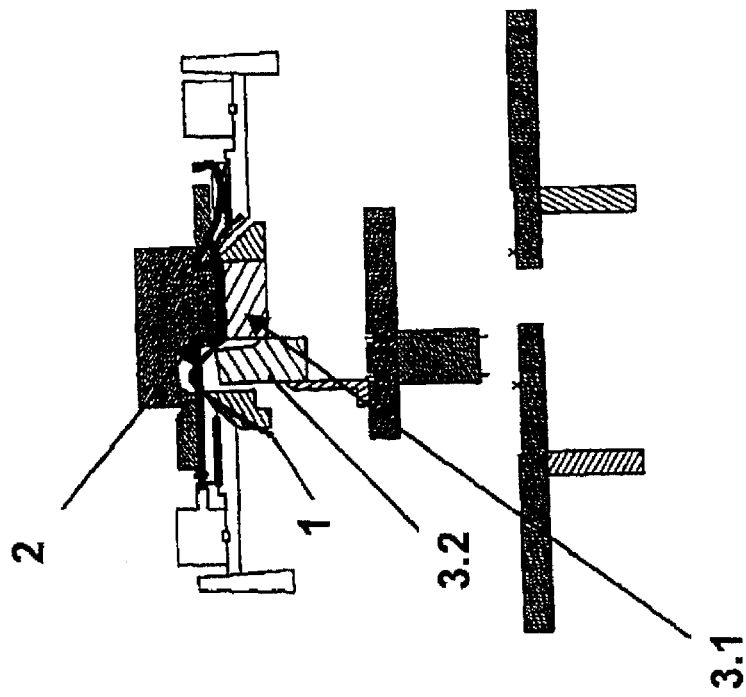
Fig. 4.3
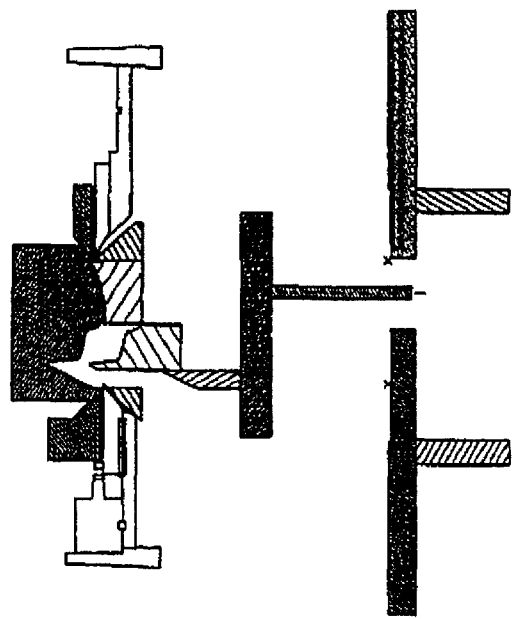
Fig. 4.2

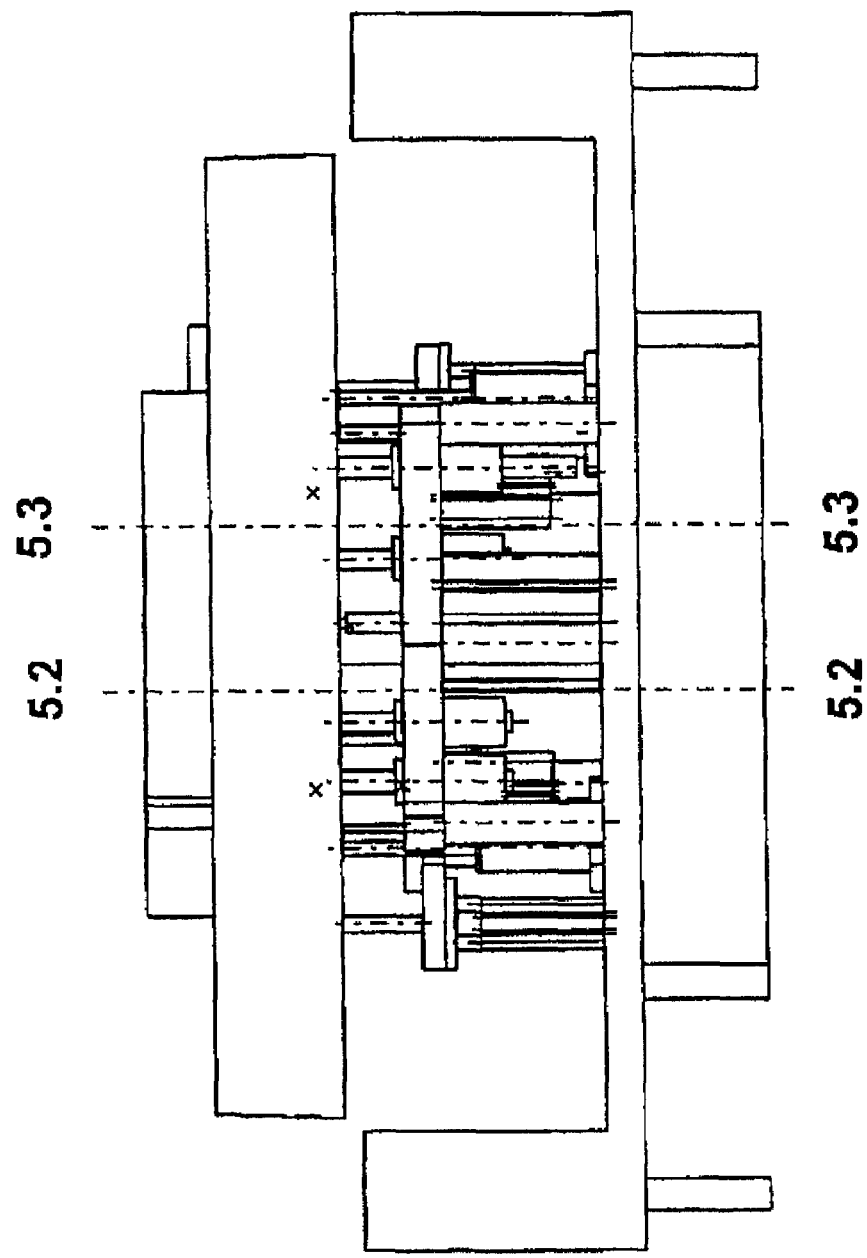

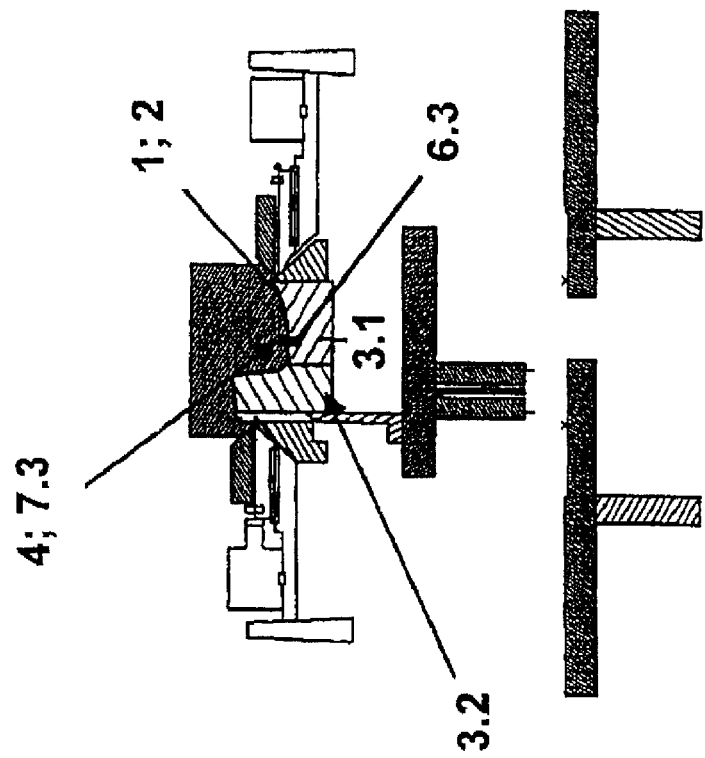
Fig. 5.3
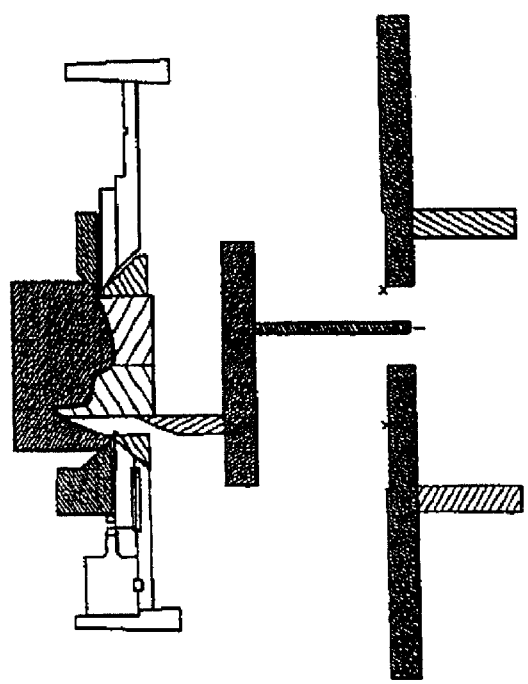
Fig. 5.2

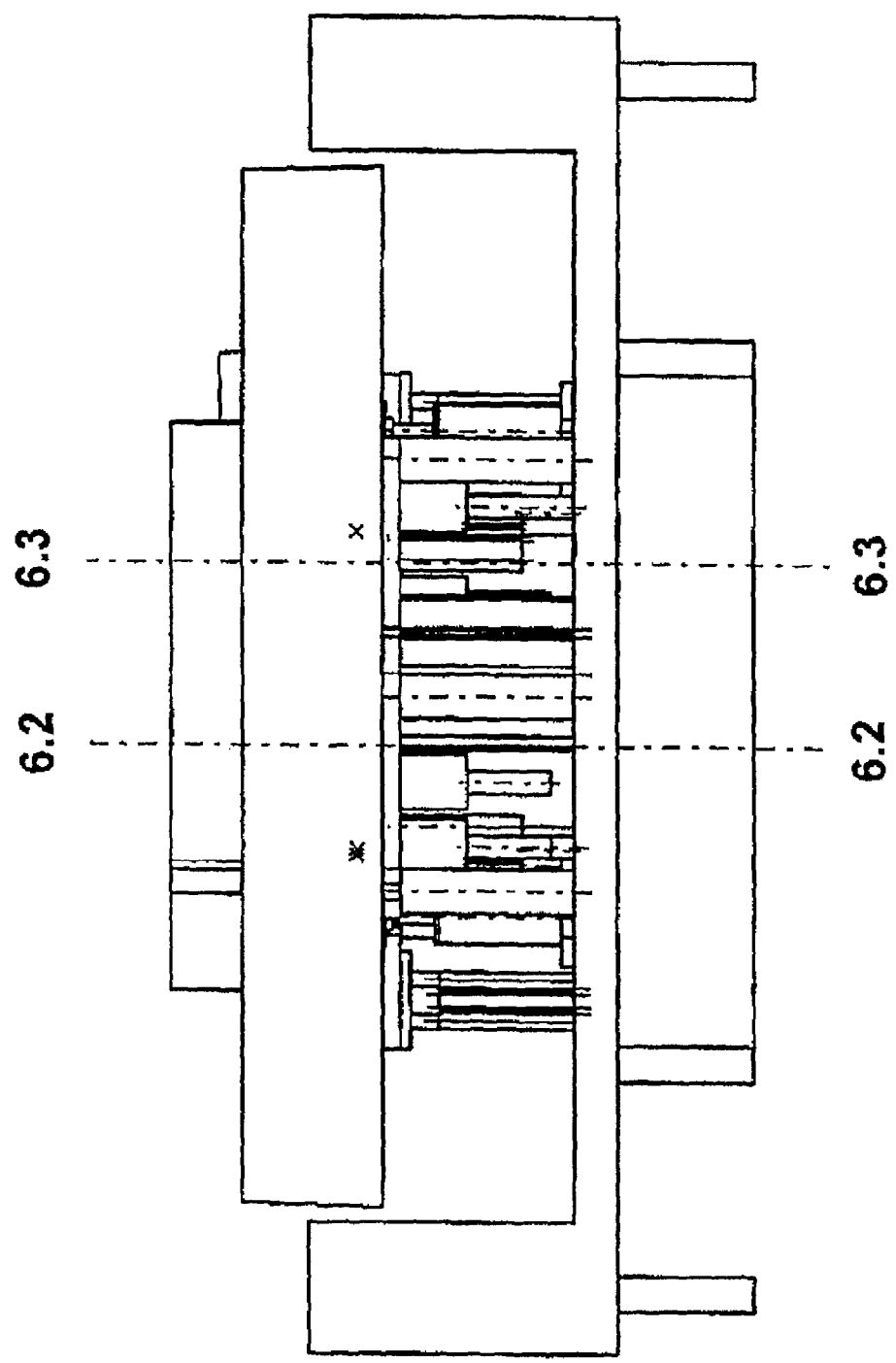
Fig. 6.1

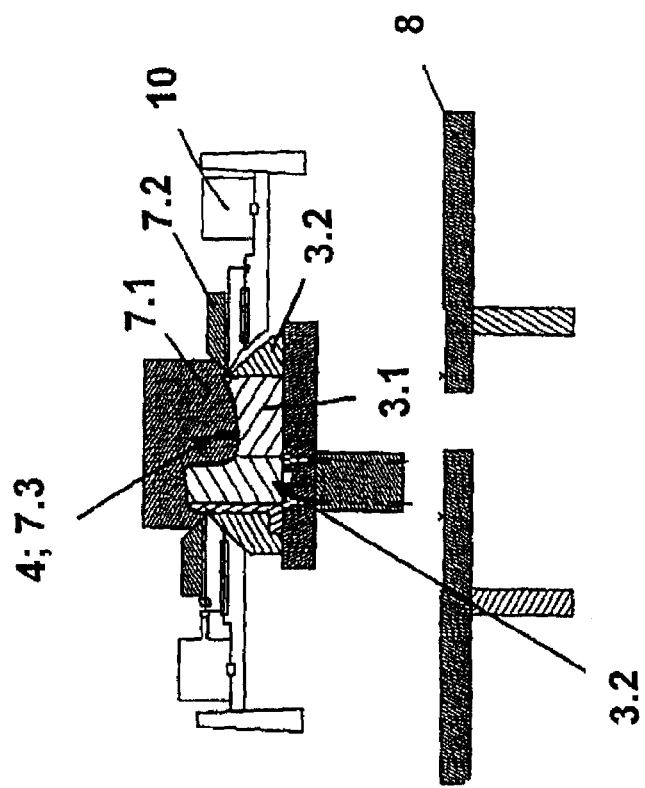
Fig. 6.3
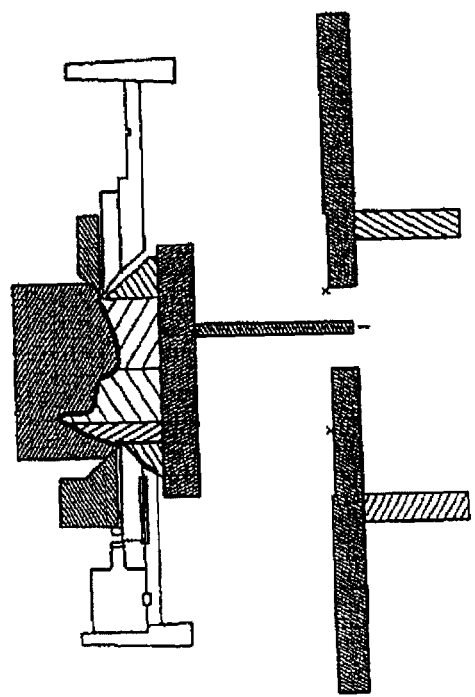
Fig. 6.2

METHOD FOR MANUFACTURING A LAMINATED MOULD PART

FIELD OF INVENTION

The present invention relates to a method for manufacturing a laminated mould part, the mould part itself, as well as to a moulding tool for manufacturing the mould part according to the method according to the invention.

The mould parts to be manufactured are in particular suitable for the motor vehicle industry, and there, in particular for motor vehicle interiors.

The method according to the invention in particular relates to a one-shot method. Hereby, a mat-like semifinished product of fibre materials containing binding agent is greatly heated and then in a press (and specifically preferably in a so-called "cold press") is connected to a decor material (a lamination) and simultaneously reshaped.

BACKGROUND INFORMATION

With usual one-shot methods, with the application of natural leather as a lamination for example, the problem exists that an exact positioning of the seams, which is important for their straight course, is not very easy. This is probably due to the fact that the leather serving as a lamination to some extent "post-flows" in an undesired manner or is regionally subjected to greater deformations than in other regions. This even leads to the one-shot method not being industrial applicable for multi-part laminations or laminations with decorative seams, despite its great advantages with regard to environmental friendliness and cost saving.

SUMMARY OF INVENTION

The present invention relates to a mould part or a method for its manufacture and a corresponding moulding tool, which ensures an exact positioning of seams or likewise, even with the manufacture in the one-shot method.

This is firstly a method for manufacturing a laminated mould part, preferably a mould part for the inner trim of a vehicle, consisting of a shape stable carrier part and viewed-side lamination of foil, fabric or similar decorative lamination materials such as leather, which is connected to this carrier part. With the method, a heated blank of a mat-like or plate-like semifinished product of fibre materials containing binding agent is moulded in a moulding tool into the mould part and thereby is simultaneously connected to the lamination (one-shot method).

The lamination is connected at least regionally to the semi-finished product before the moulding and laminating procedure with the help of "rams", in order to achieve an exact positioning of a seam or likewise.

These "rams" thus serve to press the semifinished product (the heated mat) firstly onto a special region of the decor (the lamination), thus for example onto the region of the seam, in order to "firmly hold" the seam in this region. Only after this is the remaining moulding tool closed amid corresponding deformation of the semifinished product or the lamination.

The manufacture is effected preferably with a moulding tool according to the invention. This moulding tool has a basic construction as well as a first tool half with a first contour. The first tool half is adjustable in height with respect to the basic construction, and the first tool half moreover comprises a lower clamping frame. Moreover, the moulding tool contains a second tool half with a second contour, wherein the first and second tool halves have shapes which are essentially complementary to one another in an end pressing condition. The first tool half thereby, in the region of the first contour, comprises at least one ram, which is adjustable in height with respect to the remaining first tool half or the remaining parts of the first contour.

The rams are preferably sliders which are installed in the moulding tool, which may be extended separately from the first or the second tool half and their (residual) contours, so that the first contact of the mat with the seam region of the decor is effected at all events in this region. By way of this a firm holding and pressing of the respective regions or the seam courses of the lamination as well as the semifinished product lying therebelow occurs. It is ensured that e.g. a certain seam course runs in a straight line along a certain line on the second tool half (e.g. upper tool), as is the case with the undeformed lamination. In this condition, the seam course is pressed on with the semifinished product, so that here a deformation is no longer possible, which could for example result in a "serpentine line", or with which the seam would be displaced with regard to an edge for example, etc. Both examples would be quite disadvantageous for the optical appearance, so that these are to be avoided, in particular with quality leather materials. After the particularly sensitive region with the seam/abutment or other features has been pressed on, the remainder of the two contours may be brought into congruency. Even if a "post-flowing" should now occur, one ensures on account of the pressed ram, that this is not effected in the region of the seam or likewise, so that this is optically less significant.

One advantageous further formation envisages the lamination being preformed. This means that this for example is correctly cut to size, for example in a two dimensional manner, so that excess cuttings do not arise. Additionally, this may also be preformed in a three-dimensional manner, at least in regions, in order to avoid a tearing of lamination by way of deformation procedures which are too great. The lamination is advantageously of a textile material, of a film, in particular plastic film or leather.

The lamination may however also be of several parts, wherein a seam connects individual parts. Such a connection is the case for example with leather, since here, infinitely large parts or one which are not correctly cut to size are present. However, it is also possible to only provide a decorative seam, and this for example is the case with plastic parts. Of course the parts may also directly abut one another (with their respective end-sides) or slightly overlap. In this case, the visible upper edge (which faces the later vehicle interior) is to be understood as the "seam course".

The semifinished product is preferably of fibre materials containing binding agents, thus for example natural fibres, such as e.g. wood fibres, with polyolefins as binding agents. In particular here, fibre mixtures of natural fibres and polypropylene fibres are considered. Application regions here are interior systems, e.g. door inserts, door trims, etc.

The semifinished product may also be introduced into the tool in a mat-like or web-like manner, or already as a finished blank, in order thus to save cuttings. The semifinished product is preferably preheated to 120° C. to 250° C., preferably 180° C. or 210° C., before pressing. Here, the press is preferably itself unheated, so that the complete pre-heat of the semifinished product is sufficient to achieve a melting onto the lamination. The invention should however not be limited to this, and the moulding tool itself may also serve as an additional heating device.

With a moulding of the mould part, the lamination or the semifinished product (thus the later carrier part) may be provided with components, for example retainers, clips or likewise, in the same press travel. These are preferably inserted into the semifinished product on the rear side (on the carrier part, thus on the side which is distant to the lamination), and later thus pressed in a fixing manner or also fastened in an adhesive manner.

Particularly advantageously, several distributor segments are to be provided, which one after the other, press the lamination and semifinished product on one another in a certain sequence. A homogenisation of the flow is achieved by way of this, and local tears do not occur, but rather an overall uniform reshaping occurs. Preferably, the first distributor element always fixes a seam region or abutment region which is to be positioned in a particularly critical manner. Only subsequent to this does one press the other sections with the further distributor segments or further parts of the respective contours.

Yet several advantageous further designs of the moulding tool are specified hereinafter.

Advantageously, one or several rams are given, which independently of one another, are adjustable in height with respect to the first tool half (thus with respect to the remaining parts of the first contour).

Hereby, the first tool half preferably contains at least one contour section, which is connected to the first tool half in an undisplaceable manner (this region thus corresponds to the contour in the classical sense, which is not movable). However, it is indeed advantageous to provide such a region, since this may serve as a guide for the rams.

Preferably, the rams and/or further parts of the first and/or second contour comprise fastening elements for fixing a lamination and/or the semifinished product. Certain seam courses etc. may be held in a certain position to the respective contour by way of this, so that a deformation (for example serpentine deformation) does not undesirably occur. Alternatively or additionally, such fastening means may also be provided on the lamination or on the semi-finished product.

Moreover, the second tool half may also have an upper clamping frame. The upper clamping frame may be height-adjustable to the second contour (thus to the second tool half).

Preferably, a middle clamping frame is to be additionally provided, for clamping the semifinished product between the lower and the middle clamping frame. The middle clamping frame is preferably to be arranged movable with respect to the lower clamping frame, in order thus to fix a semifinished product on the edge. Accordingly, the lamination may be fixable between the upper and the middle clamping frame.

The frames mentioned above (lower clamping frame, upper clamping frames, middle clamping frames) are preferably arranged such that they surround the first and the second contour and thus may clamp and press the complete edge region of the semifinished product or of the lamination, in order for example to prevent the undesirable post-flowing of the lamination or semifinished product, which would lead to the formation of creases.

BRIEF DESCRIPTION OF DRAWINGS

The invention is hereinafter explained by way of several figures. There are shown in:

FIG. 1.1 a lateral view of a moulding tool according to the invention in the initial condition, FIGS. 1.2 and 1.3 two cross sections through the moulding tool according to FIG. 1.1, FIGS. 2.1 to 6.3 further views and sections of the moulding tool according to the invention, during a pressing cycle.

FIG. 1.1 shows a lateral view of a moulding tool according to the invention.

FIG. 1.2 shows a cross section of the line 1.2-1.2 of FIG. 1.1.

FIG. 1.3 shows a further cross section, and specifically according to the section line 1.3-1.3 of FIG. 1.1.

DETAILED DESCRIPTION

Hereinafter, the basic construction of the forming tool is explained with reference to FIGS. 1.1 to 1.3.

The moulding tool has a basic construction 8, on which a first tool half 6 is arranged. This first tool half 6 is displaceable in height with respect to the basic construction 8 in a hydraulic manner. The first tool half has a base plate 6.4, on which a lower clamping frame 6.2 is deposited. This is displaceable in height with respect to the base plate 6.4 of the first tool half. Moreover, a first contour 6.1 is shown. This is constructed in a three-part manner. Hereby, a first ram segment 3.1 and a second ram segment 3.2 is given, which in each case are individually adjustable in height with respect to the base plate 6.4 independently of one another. A stationary element 6.5 is attached to the left of this, which likewise belongs to the first contour, but is firmly connected to the base plate 6.4. This first contour 6.1 with its three parts as well as the lower clamping frame as a whole form a lower mould cavity.

A middle clamping frame 10 is also shown. This is likewise displaceable in height with respect to the basic construction 8. The lower side of this clamping frame hereby is regionally designed in a complementary manner to the upper side of the lower clamping frame 6.2, in order thus to fix an edge region of a semifinished product, which is incorporated therebetween. A deposited and positioned decor (lamination) is to be seen on the upper side of the middle clamping frame.

A second tool half 7 is arranged above, which is likewise height adjustable with respect to the basic construction 8. This has a second contour 7.1. Here, this has no ram segments, but these are basically also possible herein. The second tool half 7 moreover comprises an upper clamping frame 7. This is also adjustable in the height direction with respect to the second contour 7.1) (the "upper mould cavity"), and the gap dimension may thus be set to the upper contour of the middle clamping frame, on which the lamination 2 is applied.

FIG. 1.3 shows the section according to 1.3-1.3 of FIG. 1.1. Whereas FIG. 1.2 shows a section in the region of the recessed grip of a motor vehicle interior trim, FIG. 1.3 here shows the region of an arm rest.

Thus what is shown is a mould tool 5 for manufacture of a mould part, wherein the mould tool has a basic construction 8 as well as a first tool half 6 with a first contour 6.1, wherein the first tool half 6 is height-adjustable with respect to the basic construction 8. The first tool half 6 moreover comprises a lower clamping frame 6.2. The moulding tool furthermore contains a second tool half 7 with a second contour 7.1, wherein the first and second tool half in an end pressing condition (see FIG. 6.1) have shapes which are essentially complementary to one another. The first tool half 6 in the region of the first contour 6.1 comprises at least one ram (3.1 and 3.2), which is displaceable in height with respect to the first tool half 6.

FIGS. 2.1 to 2.3 show respective sections or views, wherein the middle clamping frame 10 is arranged in an upper position. The lamination 2 is pressed between the upper side of the middle clamping frame 10, as well as the lower side of the upper clamping frame 7.2. Hereby, the lamination is positioned between the clamping frame halves and held or pushed through without creases (see in particular FIG. 2.3).

The lower clamping frame 6.2 is at the maximal height with respect to the plate 6.4. The lower clamping frame 6.2 is thus above the greatest contour point of the lower (first) contour 6.1.

The lower clamping frame or also the base plate 6.4 is shifted significantly to the top in FIGS. 3.1 to 3.3, so that the middle clamping frame 10 almost contacts the contour of the lower clamping frame 6.2. In FIG. 3.3 only the lamination 2 as well as the semifinished product 1 is shown for reasons of an improved overview.

As is to be seen in FIG. 3.3, the lower clamping frame is contacted by the middle one and is "bridged". The semifinished product material or lamination material post-flow independently of one another, and the clamping frames are not yet pressed so firmly, that a post-flowing is prevented.

FIGS. 4.1 to 4.3 show the engagement of a first ram segment 3.1 which presses against a complementary region of the second tool half 87 and the contour there. The reshaping/lamination between this lamination and the semifinished product is concluded in this contour region, and material no longer post-flows from the outside. The decorative seam region is fixed on the decor side (thus towards the later vehicle interior) on the component which is part-moulded. Thus a post-flowing which could change the decorative seam (for example an S-shape instead of a straight line) is ruled out. Alternatively to a decorative seam, one may also provide a connection seam of individual parts (in particular with leather). However, also regions which border one another or overlapping regions of two lamination parts may be given.

The elements of the lamination 2 and semifinished product 1 which are shown connected in FIG. 4.3 have in each case been previously cut to size in order to minimise the cuttings.

The lamination consists of a textile material and/or a film-like material, in particular plastic film and/or leather.

The semifinished product consists of a wood fibre shape material with a thermoplastic binding material (polypropylene).

The semifinished product was preheated to 200° C. before the pressing. This residual heat is sufficient for a complete melting to be effected on pressing the semifinished product onto the lamination.

FIGS. 5.1 to 5.3 show the condition with which additionally the second distributor segment 3.2 presses the lamination and the semifinished product to one another. The reshaping/lamination is likewise concluded in this contour region, and material no longer post-flows (from the direction of the distributor segment 3.1 thus from the direction of the decorative seam position).

According to FIG. 5.3, one may also envisage rams and/or further parts of the first and/or second contour comprising fastening elements 6.3 or 7.3 for fixing a lamination 2 and/or the semifinished product 1. With this, an additional protection against inadvertent flowing or distortion is ensured, so that the seams remain at their predefined space. This however is only an optional measure and is not necessary in every embodiment.

FIGS. 6.1 to 6.3 show the end condition. Hereby, the first contour is closed to such an extent, that the lamination and pressing also exists in the region of the stationary element 6.5. The reshaping/lamination is concluded and the cooling time and holding time begins (depending on the component contour and the design of the tool cooling and material thickness, 150-120 seconds, preferably 20-30 seconds). Possible additional process steps may be effected and the protruding edge is separated away. After the competition of this step, the tool opens and moves back again into the basic position according to FIG. 1.1. The completed mould part or the edge section (waste) are removed.

What is shown here for example is a method for manufacturing a laminated mould part, preferably a mould part for the inner trim of a motor vehicle. This consists of a shape-stable carrier part and a visible-side lamination connected to this, of film, fabric or similar decorative lamination materials such as e.g. leather. In the heated condition, a mat-like or plate-like semifinished product 1 of fibre materials containing binding agents is moulded in a moulding tool into a mould part and thereby is simultaneously connected to the lamination 2. The lamination is regionally connected to the semifinished product before the moulding procedure or lamination procedure with the help of rams (3.1; 3.2). Here, "moulding procedure" or "lamination procedure" means the final moulding and lamination as well as cooling. By way of the fact that a positioning for example of seams or abutments is effected in the region of the rams, a "post-flowing" in other regions is prevented, which for example could lead to a deformation of this seam.

Moreover, with the provision of several rams which are moved in a predefined interval, one succeeds in a prevention of a "tearing" of the semifinished product.

The present invention differs immensely from the state of the art with regard to the very sensitive treatment of seams or other transmissions, which are important with regard to the aesthetic appearance of the later mould part.

Once again, a few aspects of the moulding tool or the method to be carried out for the manufacture of the mould part according to the invention will be dealt with. The reshaping process of the moulding tool takes place by way of the displacement of the first tool half, the second tool half or the clamping frame in the Z-direction (see FIG. 1.1).

Hereby at the forefront is the fact that firstly the sensitive decorative seams or transitions or seams etc., are suitably fixed by way of ram, in order to prevent a deformation (for example serpentine formation of the seams). Moreover, a deformation which is adapted to the liquid limit of the respective material is to be ensured by way of the number of rams (under certain circumstances several rams per tool half).

For this, the respective clamping frames which are not necessarily plane, decisively contribute to preloading the semifinished product or the lamination in a plane manner, which however have variations at least in the Z-direction.

Hereby, it is advantageous that the second tool half 7 has an upper clamping frame 7.2. This is advantageously height adjustable, preferably to the second contour 7.1 of the second tool half. In this manner, a lamination which is prestressed in an uneven condition and thus is already largely adapted in its edge contour to the mould part, may be travelled towards this second contour, in order once again here to be preloaded in an even greater uneven manner.

The same is possible with the lower clamping frame which is height-adjustable to the first contour of the first tool half.

Hereby, it is advantageous that the edge contour of the upper clamping frame may vary at least in the height direction (Z-direction). Likewise, the edge contour of the lower clamping frame 6.2 may vary at least in the height direction. The lamination as well as the preheated semifinished product may be preloaded independently of one another by way of this, so that these parts may be brought into their end shape in a well preformed manner and hereby the connection between the lamination and the semifinished product takes place simultaneously.

A careful preforming takes place by way of this targeted preforming (under certain circumstances amid the application of several rams, not only one ram per tool half). Moreover, by way of the clamping or the fixation of lamination and/or semifinished product, one succeeds in a defined material re-supply being given with a further deformation, i.e. not too much material post-flows, which could lead to the formation of creases.

It is therefore advantageous for the lamination 2 or the semifinished product 1 to be able to be preloaded in a surfaced manner (thus to be able to even be preloaded in an uneven surfaced manner), and in the preloaded condition to be able to be displaced to parts of a shaping tool half of the moulding tool. What is important with this preloading is the adaptation to the edge topography of the later mould part.

Particularly advantageously with the present mould tool, is the middle clamping frame 10 which gives the complete structure a high stability. The lamination 2 is preferably fixable between the upper side of the middle clamping frame 10 and the lower side of the lower clamping frame 7.2. In these contact regions, the upper clamping frame 7.2 as well as the middle clamping frame 10 are adapted to one another, so that here too, one may also represent uneven topographies (above all changes in the Z-direction), and the lamination may be fixed or clamped accordingly.

The same applies to the lower clamping frame in relation to the middle clamping frame 10. Here for example, the semifinished product may be clamped between these two parts, as the case may be, also in an uneven manner, in order here to ensure a "predeformation" already adapted in height (z-direction) and to prevent an unintended post-flowing of material (which may lead to crease formation).

The invention claimed is:

1. A moulding tool for manufacturing a mould, comprising:
   a basic construction;
   a first tool half having a first contour, the first tool half being height-adjustable with respect to the basic construction, the first tool half comprising a lower clamping frame;
   a second tool half with a second contour, the second tool half comprising an upper clamping frame; and
   a middle clamping frame clamping a semifinished product between the lower and the middle clamping frames, wherein the middle clamping frame has a side complimentary to a side of at least one of the lower and upper clamping frame to fix or clamp a semifinished product,
   wherein the first and second tool halves have shapes that are substantially complementary to one another in an end pressing condition,
   wherein the first tool half in the region of the first contour comprises at least a first ram that is height-displaceable with respect to a remaining first tool half,
   wherein the first ram is movable independently of the first contour, and
   wherein a second ram bordering the first ram is moveable independently of the first contour and of the first ram.

2. A moulding tool for manufacturing a mould, comprising:
   a basic construction;
   a first tool half having a first contour, the first tool half being height-adjustable with respect to the basic construction, the first tool half comprising a lower clamping frame;
   a second tool half with a second contour, the second tool half comprising an upper clamping frame; and
   a middle clamping frame clamping a semifinished product between the lower and the middle clamping frames, wherein the middle clamping frame has a side complimentary to a side of at least one of the lower and upper clamping frame to fix or clamp a semifinished product,
   wherein the first and second tool halves have shapes that are substantially complementary to one another in an end pressing condition,
   wherein the first tool half in the region of the first contour comprises at least a first ram that is height-displaceable with respect to a remaining first tool half and the first ram being movable independently of the first contour and being actively movable to extend beyond an upper edge of the first contour in the direction of the second tool half and the first ram having a shape complimentary to a part of the second contour lying opposite of the first ram, and
   wherein a second ram borders the first ram and is moveable independently of the first contour and of the first ram.

3. The moulding tool according to claim 2, further comprising:
   a plurality of rams being height-adjustable with respect to the first tool half, independently of one another.

4. The moulding tool according to claim 2, wherein the first tool half comprises at least one contour section being undisplaceably connected to the first tool half.

5. The moulding tool according to the claim 3, wherein at least one of the rams and further parts of one of the first and the second contour comprises fastening elements for fixing at least one of the lamination and the semifinished product.

6. The moulding tool according to claim 2, wherein the upper clamping frame is height-adjustable to the second contour of the second tool half.

7. The moulding tool according to claim 2, wherein the lower clamping frame is height adjustable to the first contour of the first tool half.

8. The moulding tool according to claim 2, wherein an edge contour of the upper clamping frame varies at least in the height direction.

9. The moulding tool according to claim 2, wherein an edge contour of the lower clamping frame varies at least in the height direction.

10. The moulding tool according to claim 2, wherein the lower frame and middle frame clamp the semifinished product in an uneven manner.

11. The moulding tool according to claim 2, wherein the side of the clamping frame has an uneven topology.

12. The moulding tool according to claim 2, wherein a lamination is fixable between the upper and the middle clamping frames.

13. The moulding tool according to claim 2, wherein the first ram is moveable beyond the outer edge of the first contour such that it comes into contact with the part of the second tool half before the first contour contacts the second tool half.

* * * * *